United States Patent
Lazzarini

[15] 3,642,520
[45] Feb. 15, 1972

[54] DRIVE ROLLER
[72] Inventor: Louis P. Lazzarini, San Jose, Calif.
[73] Assignees: Genevieve I. Hanscom, Santa Cruz, Calif.; Genevieve I. Hanscom, Robert Magnuson and Lois J. Thomson, as Trustees of the Estate of Roy M. Magnuson, , part interest to each
[22] Filed: Aug. 27, 1970
[21] Appl. No.: 67,318

[52] U.S. Cl. ...................117/94, 117/DIG. 1, 117/120, 99/103, 134/6, 134/25 R, 146/46, 198/127, 193/37
[51] Int. Cl. ..............................B08b 7/04, B08b 7/00
[58] Field of Search..............99/103; 134/6, 25 R; 146/46; 117/DIG. 1, 94, 120; 198/127

[56] References Cited
UNITED STATES PATENTS 2,072,865  3/1937  Bryant.......................................99/103
3,529,971  9/1970  Pais et al..................................99/103

Primary Examiner—Alfred L. Leavitt
Assistant Examiner—Edward G. Whitby
Attorney—Allen and Chromy

[57] ABSTRACT

The present apparatus relates to roller conveyors employed in fruit and vegetable peeling operation where a caustic treatment is followed by the application of infrared radiant heat. The rollers which carry and turn the potatoes under the infrared rays become coated with a pastelike layer of substance removed from the potato and this layer is baked on the cylindrical roller to provide a drive surface thereon.

1 Claim, 3 Drawing Figures

INVENTOR.
LOUIS P. LAZZARINI
BY
*Allen and Chromy*
ATTORNEYS

DRIVE ROLLER

DESCRIPTION OF THE INVENTION

The present invention relates to rollers for use in peeling of fruit and vegetable articles, more particularly, to white potatoes.

It is a general object of the invention to provide a drive surface or coating on a roller for carrying fruit or vegetable articles coated with lye through an infrared treating zone and for effecting turning thereof while travelling through the zone.

Another object of the invention is to provide a drive surface on the rollers of a roller conveyor wherein the more or less sticky pastelike material removed from the surface of articles such as white potatoes is spread uniformly over a roller into a surface layer and is hardened on the roller to provide a drive surface thereon.

A further object of the invention is to provide a novel method of forming a satisfactory drive surface for a fruit or vegetable article which has become slick.

Other objects and advantages of this invention shall be apparent from the following description of certain preferred embodiments thereof as illustrated in the accompanying drawings, in which.

The instant invention relates to the type of apparatus disclosed in a application for U.S. Letters Patent of Lazzarini and Smith, Ser. No. 46,228 filed June 15, 1970 for ROLLER CLEANING MECHANISM, and reference is made to the above-identified application for details of the construction not shown herein.

Figure 3:
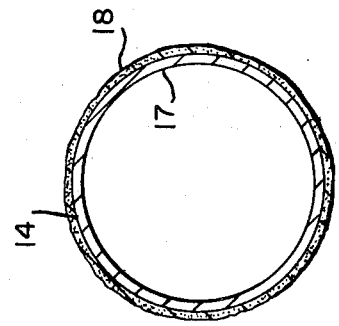
FIG. 3 is a transverse sectional view through a roller taken as indicated by the line 3—3 in FIG. 2.
Figure 2:
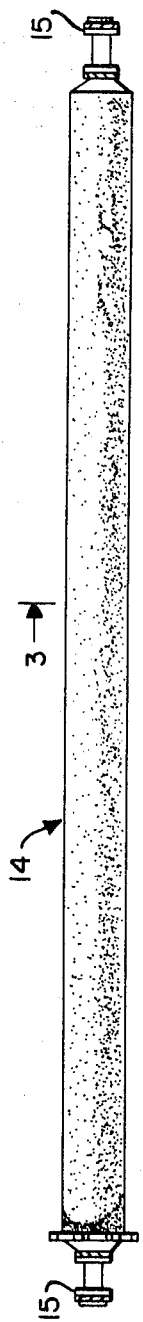
FIG. 2 is an elevational view of one of the rollers of the roller conveyor.
Figure 1:
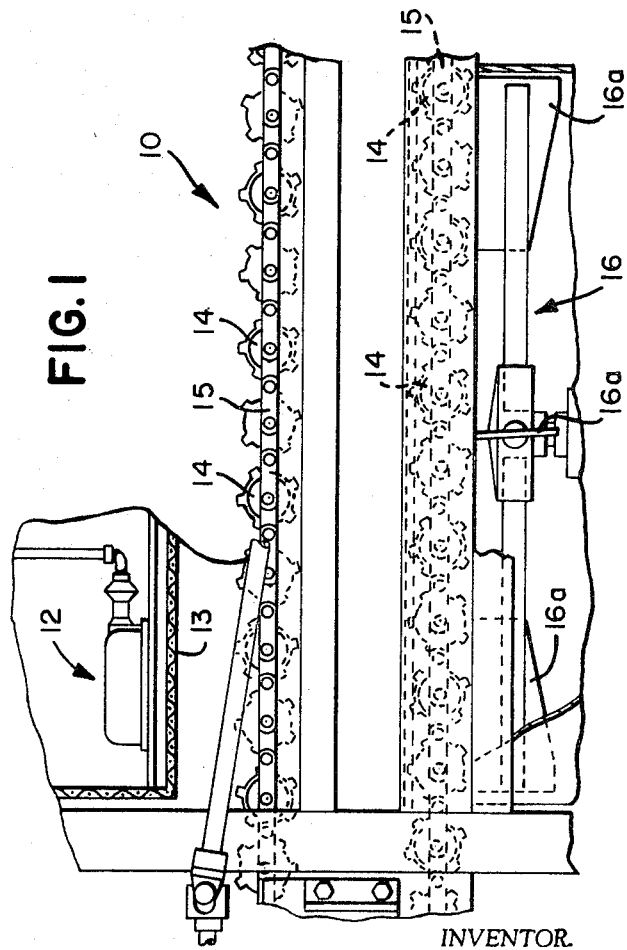
FIG. 1 is a schematic side elevational view partially broken away and partially shown in section illustrating the relation of the roller conveyor to the overhead infrared heat unit.

Referring to the drawings, in FIG. 1 there is illustrated a roller conveyor 10, which is adapted to pass beneath an overhead infrared heat unit 12 having a barrier screen 13 disposed there-beneath. The roller conveyor 10 has rollers 14 journaled in a pair of chains 15, the upper stretch passing close beneath the heat unit 12, and the lower stretch passing over suitable track supports. A roller clean-off mechanism 16 is provided below the lower stretch of the conveyor, comprising four blades 16a travelling in a horizontal path. The blades 16a are spaced a short distance below the rollers 14 so as to leave a layer of the material taken off of the product being treated such as a fruit or vegetable, for example, white potatoes. The potatoes fed onto the roller conveyor have been previously treated and coated with a caustic solution so as to penetrate and condition and disintegrate the skin of the potato. In some cases in a potato chip plant, the potatoes are also coated with a grease carried by the feed water. In any event, the result is a slick article so that the potatoes do not turn well on a clean roller. It has been found to be desirable to create a baked layer or coating 18 on the outside of the cylindrical core 17 which coating will be rough and barklike and has enough "sharpness" to grip the potatoes and turn them. As the peeling process of the potatoes proceeds the potatoes will inherently lose a certain amount of skin, lye and soap as a pastelike material in the area of the roller conveyor and the buildup of this material is such that it is desirable to place a cleaning means 16 as shown in FIG. 1. With knives or blades 16 of say 5-foot diameter and rotating at about 120 revolutions per minute, and with a conveyor speed of 31 feet per minute, and with a pitch diameter of the rotary sprocket of 3.204 inches one revolution of the rollers will travel approximately 10.6 inches. During the complete travel of the rollers through 5 feet of the cleaning zone there will be 12.96 passes of the cleaning blades over the rollers. The resultant shape of the peel residue on the rollers will be cylindrical in the center and then gradually change to a 13-sided figure at the ends of the rollers. In other types of cleaning mechanisms the coating of the rollers may be cylindrical throughout.

In some cases it is desirable, after the rollers are first coated, to let the roller conveyor 10 run idly beneath the heating means 12 until it has baked or cooked the layers 18 on the cylindrical roller or core 17.

In any event once the rough barklike layer is formed on the rolls they will turn the potatoes as they pass beneath the infrared units 12 so that they will be uniformly treated over their entire surface to condition the skin for subsequent removal.

While I have shown and described a preferred form of the invention, it will be apparent the invention is capable of variation and modification from the form shown so that the scope thereof should be limited only by the scope of the claims appended hereto.

I claim:

1. A method of providing a drive between a roller of a conveyor movable through a given path and a fruit or vegetable article to be driven and rotated thereby, which comprises coating the article with a caustic, subjecting the caustic and article to heat, and carrying the coated article engaged with the roller through the conveyor path so that a portion of the surface components of the coated article resulting from the caustic and heat treatment will form a hardened layer on the roller.

* * * * *